June 20, 1967  M. BAERMANN  3,326,610

PERMANENT MAGNET BEARING

Filed Feb. 25, 1964

INVENTOR.
MAX BAERMANN

BY

*Tilbury & Body*

ATTORNEYS

United States Patent Office 3,326,610
Patented June 20, 1967

3,326,610
PERMANENT MAGNET BEARING
Max Baermann, Bensberg Wulfshof, Bezirk
Cologne (Rhine), Germany
Filed Feb. 25, 1964, Ser. No. 347,169
Claims priority, application Germany, Mar. 1, 1963,
B 70,946
7 Claims. (Cl. 308—10)

The present invention pertains to the art of bearings, and more particularly to an improved permanent magnet bearing.

This invention is particularly applicable for supporting the rotating element of an electric meter and it will be described with particular reference thereto; however, it will be appreciated that the invention has much broader applications and may be used as a bearing for a variety of precision devices.

Magnetic bearings are common in electrical measuring devices wherein the attraction forces between unlike magnetic poles or the repelling forces between like magnetic poles are used for rotatably supporting one element of the measuring device with respect to another element of the device. In most instances, the particular construction of the electrical measuring device makes the use of the repelling forces between like magnetic poles the most convenient to incorporate within the magnetic support bearing.

In the past, the magnetic bearings of electrical measuring devices usually included a ring-shaped magnet supported on a rotatable element and a similar magnet secured onto a support member. These ring-shaped permanent magnets were coaxially mounted and axially spaced so that they could be radially magnetized, i.e. magnetized to have one magnetic pole adjacent the internal cylindrical surface of the magnet and an opposite magnetic pole adjacent the external cylindrical surface of the magnet. By arranging like poles in corresponding positions on the axially spaced ring-shaped magnets, the repelling forces between the like poles were conveniently used for supporting the rotatable element with respect to the support member.

Another commonly used magnetic bearing for electrical measuring devices included two axially magnetized, cylindrical permanent magnets which were positioned coaxially with respect to each other with the pole at the axial end of one magnet facing a like pole on the axial end of the other magnet. The repelling forces between these two like poles were used to journal a rotatable element secured onto one of the magnets.

These prior permanent magnet bearing arrangements did not provide an accurate bearing support for the rotatable element and they often caused radial forces which tended to increase the frictional drag between the rotatable element and its supporting structure. In addition, these prior magnet bearings had a very poor "displacement stability." The term "displacement stability" refers to the inherent characteristic of the magnet bearing to oppose any forces tending to change the spacing between the permanent magnets forming the bearing. A permanent magnet bearing having a low displacement stability is suceptible to considerable displacement of the magnets from their equilibrium position when the magnets are subjected to external forces. Displacement of the magnets often causes extreme frictional forces between the magnets or their supporting structures.

In my copending application Ser. No. 197,942, filed May 28, 1962, now United States Letters Patent No. 3,233,950, there is disclosed a permanent magnet bearing including two coaxial permanent magnet disks each having concentric circular magnetic poles on one generally flat surface with the poles of one magnet being directly opposite to like poles of the other magnet. By using the construction disclosed in my patent, the flux lines of each permanent magnet are concentrated within a small space between the magnets so that a high displacement stability is realized. This construction is a substantial advance over permanent magnet bearings known before the invention disclosed in my copending application.

When constructing a permanent magnet bearing for an electric measuring device, the size of the magnet bearing must be maintained within certain limits dictated by the other structural characteristics of the measuring device. When utilizing the improved magnet as disclosed in my patent, an increased axial load on the bearing structure could be supported only by increasing the radial size of the permanent magnet. In this manner, larger magnetic pole areas or more magnetic poles could be provided on the axially facing surfaces of each permanent magnet ring and larger repelling forces could be created to support the larger axial load.

The present invention is directed toward an improvement in a permanent magnet bearing which improvement allows an increase in the axial load carrying capacities of a permanent magnet bearing without increasing the radial size of the magnet rings forming the bearing or sacrificing the displacement stability obtained by concentrating the flux lines of the magnetic bearing between two closely spaced, axially facing surfaces on the bearing magnet rings.

In accordance with the present invention there is provided an improvement in a permanent magnet bearing having a pair of spaced permanent magnet disks or rings with closely spaced facing surfaces, each of the disks having a cylindrical peripheral surface facing radially outward from the disks, and each of the magnet disks being magnetized with opposite polarity, circular magnetic poles. The improvement in such a magnet comprises the first of the magnetic poles being located on the facing surface of the disks and the second of the magnetic poles being located on the peripheral surface of the disks with a high permeability member on each disk for directing the flux lines of the second magnetic pole of that disk to a position adjacent the facing surface and concentric with the first magnetic pole of the disk.

By this arrangement, the cylindrical peripheral surface of each disk is used to provide the necessary increased pole area for the permanent magnet disk and the high permeability member directs the flux lines from the pole on the peripheral surface to a position adjacent the facing surface of the magnet disk. Consequently, the magnet disks will each have two concentric opposite polarity poles with a larger total pole area and, thus, a greater number of flux lines extending between the disks without increasing appreciably the radial dimensions of the permanent magnet disks. In this manner the ability of the magnetic bearing to support axial loads is increased without increasing, to a great extent, the radial size of the bearing.

The primary object of the present invention is the provision of a permanent magnet bearing which bearing is stable in operation, inexpensive to construct and has a high load supporting capacity for the volume and radial size of the magnet disks or rings forming the bearing.

Another object of the present invention is the provision of a permanent magnet bearing with spaced magnet disks which bearing has a greater flux field between two radially facing surfaces of the spaced disks than heretofore possible without increasing appreciably the radial size of the disks.

Still another object of the present invention is the provision of a permanent magnet bearing having two spaced coaxial magnet disks with a space between the disks, which space is subjected to a flux field having a higher density than heretofore possible.

Yet another object of the present invention is the provision of a permanent magnet bearing including two spaced coaxial magnet disks with each disk having one circular magnetic pole on an axially facing surface and one circular magnetic pole on a radially facing surface so that larger magnetic pole areas can be obtained without increasing the size of the axially facing surface.

These and other objects and advantages will become apparent from the following description used to illustrate the preferred embodiments of the present invention as read in connection with the accompanying drawings in which.

Figure 1:
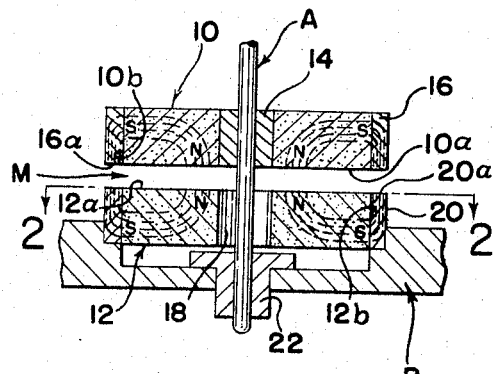
FIGURE 1 is a cross-sectional, somewhat schematic, side elevational view showing the preferred embodiment of the present invention.
Figure 2:
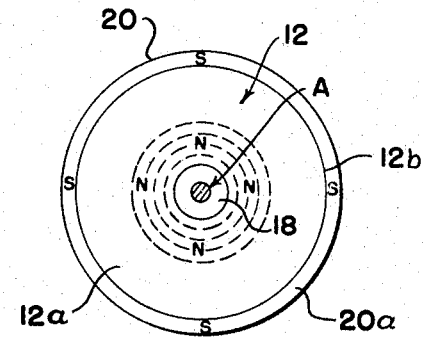
FIGURE 2 is a cross-sectional view taken generally along line 2—2 of FIGURE 1.

Referring now to the drawings wherein the showings are for the purpose of illustrating preferred embodiments of the invention only and not for the purpose of limiting same, FIGURES 1 and 2 show a permanent magnet bearing for rotatably supporting element A with respect to supporting structure B. In accordance with this preferred embodiment of the present invention, the element A supports a rotatable member (not shown) within an electrical measuring device and the magnetic bearing allows rotation of the element A with a minimum amount of frictional resistance. The magnetic bearing includes two spaced, coaxial permanent magnet disks 10, 12 which are formed from a high coercivity, low permeability permanent magnet material. Various materials having these characteristics are known in the art of permanent magnets; however, in practice the permanent magnet disks 10, 12 are formed from finely divided iron-barium-oxide bonded together by a resin, such as phenol or vinyl. The forming of the permanent magnet disks 10, 12 generally is done in a press so that the permanent magnet particles are compacted within the disks 10, 12 and held together by the resin binder. The term "high coercivity" indicates that the coercivity of the magnet material forming the disks 10, 12 is at least greater than approximately 750 oersteds. "Low permeability," as the term is used herein, indicates that the material forming the permanent magnet disks 10, 12 has a permeability approaching 1.0; however, being more general, "low permeability" indicates that the permanent magnet material forming the disks 10, 12 does not tend to direct or attract flux lines therethrough.

Many electrical measuring devices are subjected to high temperatures during use; therefore, it is often advisable to provide a permanent magnetic material for disks 10, 12 having the characteristics mentioned above with the added property of low temperature fault, i.e. small pole strength diminution with temperature increases. One such material would be Alnico of the type having a coercivity over 750–1000 oersteds which material has a temperature fault of approximately 0.2% pole strength diminution per 10° C. temperature increase. This is compared to 2.0% pole strength diminution per 10° C. temperature increase for barium ferrite. If environmental temperature is not a factor, then the barium ferrite magnetic material mentioned above is used in practice.

Referring more specifically to magnet disk 10, there is provided a sleeve 14 for fixedly securing the magnet disk onto rotatable element A so that the disk 10 rotates with the element. Disk 10 includes a lower axially facing, generally flat surface 10a and a cylindrical, radially facing surface 10b. Surrounding the radially facing surface 10b is a ring 16 formed from a high permeability material, such as soft iron, which ring has a downwardly facing, generally circular edge 16a. The ring 16 forms a flux concentrating or gathering element the function of which will be hereinafter described in detail.

Magnet disk 10 is magnetized in a manner represented by the dashed lines extending through the magnet disk 10 in FIGURE 1. Generally, the disk 10 has one circular magnetic pole, represented by N, located on axially facing surface 10a and another circular magnetic pole, represented by S, located on radially facing surface 10b. The polarity of these magnetic poles may be reversed from those shown in FIGURE 1 if the polarity of the circular magnetic poles of disk 12, which will be hereinafter described, is also reversed. The circular magnetic pole S on surface 10b of disk 10 is in direct contact with high permeability ring 16; therefore, the flux lines issuing from the radially facing surface 10b are directed or funneled through the high permeability ring 16 to the lower circular edge 16a as is represented in FIGURE 1. In this manner, a pair of opposite polarity magnetic poles are provided in the general plane of the lower axially facing surface 10a which circular poles coact with like circular poles on disk 12 to support the element A in a manner to be hereinafter described in detail.

If the north and south magnetic pole of disk 10 were both located within the magnet itself and on surface 10a, the radius, or radial dimension, of the disk 10 would have to be large enough to accommodate two large area magnetic poles. This requirement for large pole areas on surface 10a would substantially increase the radial dimension of disk 10. In accordance with the present invention, one large surface magnetic pole is provided on the peripheral, or radially facing surface 10b; therefore, there is no need for increasing the radial dimension of disk 10 even though the surface area of the poles is substantially increased from that obtainable on a like dimensioned magnet disk with two poles on surface 10a. The ring 16 focuses the flux lines issuing from the radially facing pole S so that the flux lines on each pole are concentrated within the space M as shown in FIGURE 1.

Referring now to disk 12, there is provided a clearance opening 18 for element A and a high permeability ring 20 surrounds the radially facing, cylindrical surface 12b of disk 12. The disk 12 is magnetized, as indicated in FIGURE 1, to produce one circular magnetic pole on surface 12a and another circular magnetic pole on surface 12b. The latter-mentioned magnetic pole is in direct contact with ring 20 so that the flux lines issuing from this pole are focused and directed by the ring 20 toward disk 10 to form a magnetic pole on upper edge 20a, as indicated in FIGURES 1 and 2. The polarity of the poles on disks 10, 12 are selected so that like circular magnetic poles are facing each other to create repelling forces between the disks 10, 12. These repelling forces are created by the flux fields existing within space M. It is appreciated that substantially all flux lines created by magnetic disks 10, 12 are within the space M. This provides a high displacement stability for the bearing. As the space M decreases in height or thickness, the repelling forces increase rapidly and as the space M increases in height or thickness, the repelling forces decrease rapidly. With all the flux lines concentrated within the space M, this inverse relationship between the repelling forces and the spacing between the magnets is relatively high and high displacement stability is obtained.

To prevent radial displacement of element A, there is provided a bearing bushing 22 within supporting structure B in a manner commonly known in the art of magnet bearings.

Figure 3:
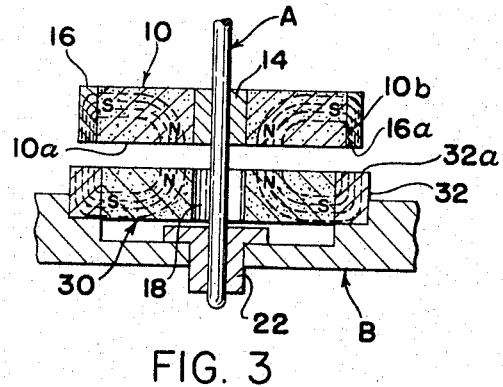
FIGURE 3 is a cross-sectional, somewhat schematic, side elevational view showing a modification of the preferred embodiment shown in FIGURE 1.

Referring now to FIGURE 3, there is illustrated a modification of the magnetic bearing shown in FIGURES 1 and 2. Permanent magnet disk 10 is substantially identical to disk 10 of FIGURE 1; however, disk 12 of FIGURE 1 is replaced by magnet disk 30 in the embodiment shown in FIGURE 3. Disk 30 has a slightly lesser radial dimension than disk 12 and a high permeability ring 32, with a radial thickness larger than the radial thickness of ring 16, is secured around the disk 30. During normal operation, the ring 16 is centered with respect to ring 32; however, slight radial movement of disk 10 will shift ring 16 with respect to ring 32. In accordance with this embodiment of the present invention, this radial shifting of the rotatable disk 10 does not substantially affect the forces between the magnetic disks because ring 16 will remain over ring 32 and the like poles of these rings will not be displaced with respect to each other. In accordance with the embodiment shown in FIGURE 1, slight movement of the ring 10 can cause some misalignment of the like poles on the edges of rings 16, 20 so that the whole pole areas or fields do not act perpendicularly against each other. Other than this small modification, the operation of the magnetic bearing shown in FIGURE 3, is identical with the operation of the magnetic bearing shown in FIGURES 1 and 2.

Figure 4:
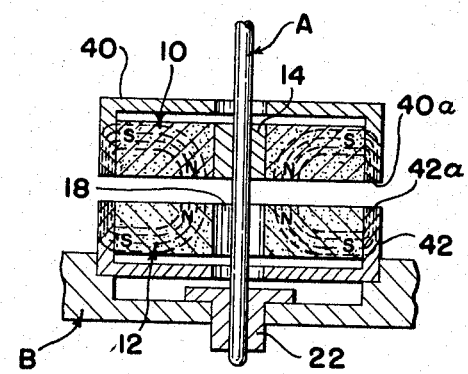
FIGURE 4 is a cross-sectional, somewhat schematic, side elevational view showing a further modification of the preferred embodiment of the present invention as shown in FIGURE 1.

Referring now to FIGURE 4, the magnet disks 10, 12 are provided with cups 40, 42 having circular, facing edges 40a, 42a respectively. These cups are formed from high permeability material; therefore, these cups shield the bearing supporting element A from external magnetic forces. In this manner, the repelling forces between the disks 10, 12 are somewhat more stable than the forces used in the bearings shown in FIGURES 1–3.

Figure 5:
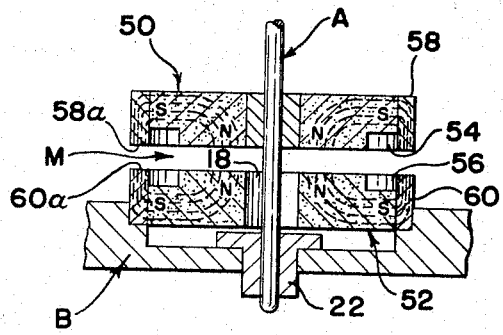
FIGURE 5 is a cross-sectional, somewhat schematic, side elevational view showing still a further modification of the preferred embodiment of the present invention as shown in FIGURE 1; and, FIGURE 6 is a cross-sectional, somewhat schematic, side elevational view showing still a further modification of the preferred embodiment of the present invention as shown in FIGURE 1.

Another modification of the invention is shown in FIGURE 5 wherein magnet disks 50, 52 are provided with annular recesses 54, 56 dividing the opposite polarity circular poles designated N, S. Rings 58, 60 surround the radially facing surfaces of disks 50, 52, respectively, so that these rings can direct the flux lines from the poles on the radially facing surfaces to their respective edges 58a, 58b. The annular recesses 54, 56 physically isolate the opposite polarity poles of each disk so that there is no tendency for stray flux lines to flow through the magnet itself from one pole to the other pole. Such stray flux lines tend to decrease the flux within the space M. The permeability of the air within the annular recesses is 1.0 which permeability is somewhat less than the permeability of the magnet material forming disks 50, 52 even though they are formed from magnetic material having low permeability approaching 1.0.

The operation of the permanent magnet bearing shown in FIGURE 5 is not substantially different from the operation of the bearing illustrated in FIGURES 1–4.

Figure 6:
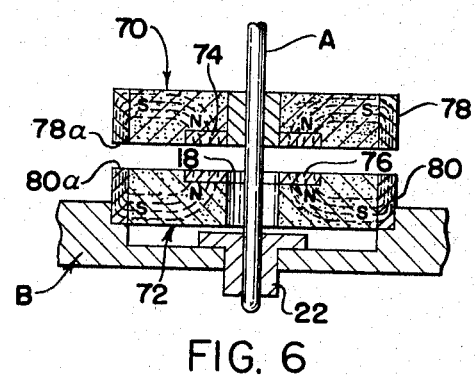

Referring now to FIGURE 6, another modification of the present invention is illustrated wherein the permanent magnet disks 70, 72 are provided with annular rings 74, 76 formed from high permeability material, such as soft iron. These rings 74, 76 tend to concentrate the flux lines issuing from the pole on the axially facing surfaces of the disks 70, 72 to prevent stray flux lines from flowing through the magnet material itself. Surrounding the disks 70, 72 there are provided rings 78, 80, respectively, which rings collect the flux lines issuing from the circular magnetic poles on the radially facing surfaces of the disks and direct these flux lines to the circular edges 78a, 80a so that these edges form concentric, like polarity, magnetic poles with respect to rings 74, 76. The operation of this permanent magnet bearing is substantially the same as the operation of the other permanent magnet bearings discussed above.

In the production of the various disks explained above, the outer flux concentrating ring is first placed into a mold and a mixture of finely divided permanent magnet particles having the desired characteristics and a suitable binder, such as phenol or vinyl resin, is then placed within the mold. Thereafter, a ram or other molding structure is used to press the magnet mixture into the desired shape before it is cured by heat and/or pressure. This provides a simple procedure or method for producing the magnet disks as used in the permanent magnet bearing described in the present application and to which the present invention is directed.

This invention has been described in connection with certain structural embodiments; however, it is to be appreciated that various structural changes may be made without departing from the intended spirit and scope of the present invention as defined in the appended claims.

Having thus described my invention, I claim:

1. In a permanent magnet bearing having a pair of spaced permanent magnet disks with closely spaced facing surfaces, each of said disks having a cylindrical peripheral surface facing radially outward from said disks, each of said magnet disks being magnetized with opposite polarity, circular magnetic poles, the improvement comprising: the first of said poles being located on the facing surface of said disks and the second of said poles being located on the peripheral surface of said disks, and a high permeability member on each disk for directing the flux lines of said second pole of that disk to a position adjacent said facing surface and concentric with said first pole, said high permeability members being metal rings with one ring around said peripheral surface of each disk, each of said rings having an axial edge generally aligned with the facing surface of the disk it surrounds, and said edges being concentric and facing each other.

2. The improvement as defined in claim 1 wherein said rings are coaxial and one of said rings has a radial thickness larger than the radial thickness of said other ring.

3. In a permanent magnet bearing having a pair of spaced permanent magnet disks with closely spaced facing surfaces, each of said disks having a cylindrical peripheral surface facing radially outward from said disks, each of said magnet disks being magnetized with opposite polarity, circular magnetic poles, the improvement comprising: the first of said poles being located on the facing surface of said disks and the second of said poles being located on the peripheral surface of said disks, and a high permeability member on each disk for directing the flux lines of said second pole of that disk to a position adjacent said facing surface and concentric with said first pole, said high permeability members being cup-like elements, each of said elements having a cylindrical side wall surrounding said peripheral surface of one of said disks, each of said side walls having an axial edge generally aligned with said facing surface of the disk it surrounds, and said edges being coaxial and facing each other.

4. In a permanent magnet bearing having a pair of spaced permanent magnet disks with closely spaced facing surfaces, each of said disks having a cylindrical peripheral surface facing radially outward from said disks, each of said magnet disks being magnetized with opposite polarity, circular magnetic poles, the improvement comprising: the first of said poles being located on the facing surface of said disks and the second of said poles being located on the peripheral surface of said disks, and a high permeability member on each disk for directing the flux lines of said second pole of that disk to a position adjacent said facing surface and concentric with said first pole, said poles of each disk being separated from each other by an annular recess in said facing surface of said disk, and said recess being generally coaxial with said poles of said disk.

5. In a permanent magnet bearing having a pair of spaced permanent magnet disks with closely spaced facing surfaces, each of said disks having a cylindrical peripheral surface facing radially outward from said disks, each of said magnet disks being magnetized with opposite polarity, circular magnetic poles, the improvement comprising: the first of said poles being located on the facing surface of said disks and the second of said poles being located on the peripheral surface of said disks, and a high permeability member on each disk for directing the flux lines of said second pole of that disk to a position adjacent said facing surface and concentric with said first pole, each of said disks including an annular, high permeability ring secured onto said facing surface of said disk, said ring being concentric with and coinciding with said poles on the facing surface of said disk.

6. In a permanent magnet bearing having a pair of spaced permanent magnet disks with closely spaced facing surfaces, each of said disks having a cylindrical peripheral surface facing radially outward from said disks, each of said magnet disks being magnetized with opposite polarity, circular magnetic poles, the improvement comprising: the first of said poles being located on the facing surface of said disks and the second of said poles being located on the peripheral surface of said disks, and a high permeability member on each disk for directing the flux lines of said second pole of that disk to a position adjacent said facing surface and concentric with said first pole, said disks being formed from a magnetic material including finely divided, high coercivity, low permeability permanent magnet particles bonded within a plastic binder.

7. In a permanent magnet bearing having a pair of spaced permanent magnet disks with closely spaced facing surfaces, each of said disks having a cylindrical peripheral surface facing radially outward from said disks, each of said magnet disks being magnetized with opposite polarity, circular magnetic poles, the improvement comprising: the first of said poles being located on the facing surface of said disks and the second of said poles being located on the peripheral surface of said disks, and a high permeability member on each disk for directing the flux lines of said second pole of that disk to a position adjacent said facing surface and concentric with said first pole, said disks being formed from a magnetic material having a coercive force greater than 750 oersteds and a low temperature fault.

References Cited

UNITED STATES PATENTS 3,233,950　2/1966　Baermann _____ 308—10

FOREIGN PATENTS 1,326,781　4/1963　France.
1,338,341　8/1963　France.

MILTON O. HIRSHFIELD, *Primary Examiner.*

J. J. SWARTZ, *Assistant Examiner.*